(12) United States Patent
Huempfner

(10) Patent No.: US 10,341,540 B2
(45) Date of Patent: Jul. 2, 2019

(54) CAMERA SYSTEM FOR GAS-INSULATED SWITCHGEAR SYSTEMS

(71) Applicant: Siemens Aktiengesellschaft, Munich (DE)

(72) Inventor: Jens Huempfner, Aschaffenburg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 15/763,220

(22) PCT Filed: Sep. 6, 2016

(86) PCT No.: PCT/EP2016/070942
§ 371 (c)(1),
(2) Date: Mar. 26, 2018

(87) PCT Pub. No.: WO2017/055018
PCT Pub. Date: Apr. 6, 2017

(65) Prior Publication Data
US 2018/0278813 A1 Sep. 27, 2018

(30) Foreign Application Priority Data
Sep. 28, 2015 (DE) .......... 10 2015 218 645

(51) Int. Cl.
*H04N 5/225* (2006.01)
*H01H 1/00* (2006.01)
(Continued)

(52) U.S. Cl.
CPC .......... *H04N 5/2252* (2013.01); *G03B 17/08* (2013.01); *H01H 1/0015* (2013.01);
(Continued)

(58) Field of Classification Search
CPC .................................................. H04N 5/2252
See application file for complete search history.

(56) References Cited

U.S. PATENT DOCUMENTS 6,501,572 B1 * 12/2002 Poth .................. H02B 13/0356
361/605
2005/0152287 A1 * 7/2005 Yokomitsu ........ H04L 29/06027
370/255
(Continued)

FOREIGN PATENT DOCUMENTS

DE 19653683 C1 6/1998
DE 10353498 A1 4/2004
(Continued)

OTHER PUBLICATIONS

German Office Action and English translation thereof dated Jul. 26, 2016.
(Continued)

*Primary Examiner* — Rowina J Cattungal
(74) *Attorney, Agent, or Firm* — Harness, Dickey & Pierce, P.L.C.

(57) ABSTRACT

A camera system for gas-insulated switchgear systems, includes a front plate of the gas-insulated switchgear system having two front-plate connections, a central unit, and at least one camera in a camera housing or in respective camera housings. The line between the front-plate connections and the at least one camera is branched in the shape of a Y and the data communication and the current and voltage supply of the central unit occur via a common connection.

19 Claims, 2 Drawing Sheets

(51) Int. Cl.
*G03B 17/08* (2006.01)
*H04N 7/10* (2006.01)
*H01R 27/02* (2006.01)
*H02B 13/00* (2006.01)
*H04N 5/247* (2006.01)

(52) U.S. Cl.
CPC ........... *H04N 5/2257* (2013.01); *H04N 7/108* (2013.01); *H01H 2001/0021* (2013.01); *H01R 27/02* (2013.01); *H02B 13/00* (2013.01); *H04N 5/2256* (2013.01); *H04N 5/247* (2013.01); *H04N 2005/2255* (2013.01)

(56) References Cited

U.S. PATENT DOCUMENTS

| | | | | |
|---|---|---|---|---|
| 2006/0103726 | A1* | 5/2006 | Hertrich | H04N 5/23203 348/143 |
| 2009/0059945 | A1 | 3/2009 | Yokomitsu et al. | |
| 2012/0251072 | A1* | 10/2012 | Cope | G09F 9/33 386/230 |
| 2012/0281083 | A1* | 11/2012 | Chivers | G03B 17/02 348/81 |
| 2016/0006223 | A1* | 1/2016 | Sinistro | H02B 1/052 361/622 |

FOREIGN PATENT DOCUMENTS

| | | |
|---|---|---|
| DE | 112005000173 T5 | 12/2006 |
| DE | 202006019859 U1 | 4/2007 |
| EP | 1022904 A1 | 7/2000 |
| EP | 2833495 A1 | 2/2015 |
| JP | H10174231 A | 6/1998 |
| WO | WO 2007093575 A1 | 8/2007 |

OTHER PUBLICATIONS

German Decision to Grant and English translation thereof dated Oct. 19, 2016.
German Office Action #102015218645.8 dated Jul. 26, 2016.
International Search Report PCT/ISA/210 for International Application No. PCT/EP2016/070942 dated Nov. 25, 2016. 0.
Written Opinion of the International Searching Authority PCT/ISA/237 for International Application No. PCT/EP2016/070942 dated Nov. 25, 2016.

* cited by examiner

CAMERA SYSTEM FOR GAS-INSULATED SWITCHGEAR SYSTEMS

PRIORITY STATEMENT

This application is the national phase under 35 U.S.C. § 371 of PCT International Application No. PCT/EP2016/070942 which has an International filing date of Sep. 6, 2016, which designated the United States of America and which claims priority to German patent application number DE 102015218645.8 filed Sep. 28, 2015, the entire contents of which are hereby incorporated herein by reference.

FIELD

An embodiment of the present invention generally relates to a camera system for gas-insulated switchgear systems and in particular the connection of the camera to a central unit.

BACKGROUND

EP1022904A1 discloses a camera system made up of a camera and a suitable light source which is arranged in the housing of a low-voltage circuit breaker.

DE10353496A1 describes a device for coupling modulated carrier frequencies into high-voltage lines, in order thus to be able to transmit images of a video camera. The video camera enables monitoring of various switch positions.

DE202006019859U1 discloses a switchgear system including a monitoring camera and a lighting device for lighting the contacts of a switch.

The data transmission takes place via a USB interface.

Since gas-insulated switchgear systems have a relatively high life expectancy, the aim is to use components in the camera systems which are preferably software- and hardware-independent. This applies in particular to the camera systems for monitoring the switch position and/or critical components in gas-insulated switchgear systems.

SUMMARY

At least one embodiment of the present invention provides a camera system for gas-insulated switchgear systems, in particular medium-voltage switchgear systems, which enable an optimized and preferably platform-independent connection between a central unit, i.e., a computer system or a data processing system or an image processing system or an image display system, and the camera.

In one example embodiment, the camera system for gas-insulated switchgear systems includes a front plate of the gas-insulated switchgear system having two front plate connectors, a central unit, at least one camera in a camera housing or in a respective camera housing, wherein
  the central unit is connectable to a first camera of the at least one camera for data communication,
  the central unit has a DHCP server and a captive portal, in particular a captive portal redirect,
  the camera housing or the respective camera housing of the at least one camera is conductive, and the conductive camera housing or the conductive camera housings enhance the electromagnetic compatibility and are conductively connectable to one component of the gas-insulated switchgear system,
  the camera housing or the camera housings are strengthened by means of natural rubber seals or carbon-free rubber seals for use in SO2 and/or salt spray environments,
  the central unit is accommodated in the camera housing of the first at least one camera,
  the central unit has a power supply for supplying current and voltage to the at least one camera, and wherein the power supply is suitable for supplying the at least one camera with an input voltage, in particular an input voltage from 4 V to 17 V, to the at least one camera;
  on the outside of the camera housing of the first of the at least one camera having the central unit:
    a shared connector is present for a line for the data communication between at least one of the two front plate connectors and the central unit of the first of the at least one camera, as well as the current and voltage supply of the central unit of the first of the at least one camera;
  the line running from the two front plate connectors to the shared connector of the first camera of the at least one camera has a first side and a second side, wherein:
    the line on the first side has a plug which is compatible with the shared connector, or a socket which is compatible with the shared connector,
    the line branches between the first side and the second side in a y-like manner into a first connecting line and a second connecting line on the second side in such a way that
      the first connecting line provides the power supply and the voltage supply to the central unit, and is connectable to a first front plate connector of the front plate connectors, and
      the second connecting line provides the data communication between a second front plate connector of the two front plate connectors and the central unit, and is connectable to the second front plate connector.

A gas-insulated switchgear system according to at least one embodiment of the present invention including a camera system according to at least one embodiment of the present invention is made up of, in addition to the components known from gas-insulated switchgear systems, at least a front plate of the gas-insulated switchgear system having two front plate connectors, a central unit, at least one camera in a camera housing or in a respective camera housing, wherein
  the central unit is connectable to a first camera of the at least one camera for data communication,
  the central unit has a DHCP server and a captive portal, in particular a captive portal redirect,
  the camera housing or the respective camera housing of the at least one camera is conductive, and the conductive camera housing or the conductive camera housings enhance the electromagnetic compatibility and are conductively connectable to one component of the gas-insulated switchgear system,
  the camera housing or the camera housings are strengthened by means of natural rubber seals or carbon-free rubber seals for use in SO2 and/or salt spray environments,
  the central unit is accommodated in the camera housing of the first at least one camera,
  the central unit has a power supply for supplying current and voltage to the at least one camera and wherein the power supply is suitable for supplying the at least one camera with an input voltage, in particular an input voltage from 4 V to 17 V, to the at least one camera;
  on the outside of the camera housing of the first of the at least one camera having the central unit:

a shared connector is present for a line for the data communication between at least one of the two front plate connectors and the central unit of the first of the at least one camera, as well as the current and voltage supply of the central unit of the first of the at least one camera;

the line running from the two front plate connectors to the shared connector of the first camera of the at least one camera has a first side and a second side, wherein:

the line on the first side has a plug which is compatible with the shared connector, or a socket which is compatible with the shared connector, the line branches between the first side and the second side in a y-like manner into a first connecting line and a second connecting line on the second side in such a way that the first connecting line provides the current supply and the voltage supply to the central unit, and is connectable to a first front plate connector of the front plate connectors, and the second connecting line provides the data communication between a second front plate connector of the two front plate connectors and the central unit, and is connectable to the second front plate connector.

BRIEF DESCRIPTION OF THE DRAWINGS

The subject matter of the present invention will be described in greater detail below, based on individual example embodiments and figures.

DETAILED DESCRIPTION OF THE EXAMPLE EMBODIMENTS

Figure 1:
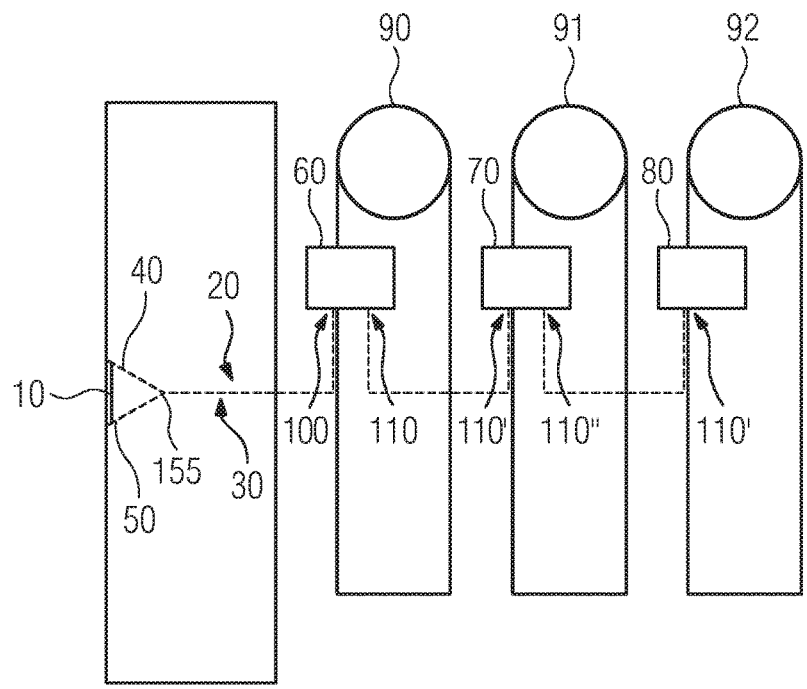
FIG. 1: schematic structure of a camera system.

In one example embodiment, the camera system for gas-insulated switchgear systems includes a front plate of the gas-insulated switchgear system having two front plate connectors, a central unit, at least one camera in a camera housing or in a respective camera housing, wherein the central unit is connectable to a first camera of the at least one camera for data communication, the central unit has a DHCP server and a captive portal, in particular a captive portal redirect, the camera housing or the respective camera housing of the at least one camera is conductive, and the conductive camera housing or the conductive camera housings enhance the electromagnetic compatibility and are conductively connectable to one component of the gas-insulated switchgear system, the camera housing or the camera housings are strengthened by means of natural rubber seals or carbon-free rubber seals for use in SO2 and/or salt spray environments, the central unit is accommodated in the camera housing of the first at least one camera, the central unit has a power supply for supplying current and voltage to the at least one camera, and wherein the power supply is suitable for supplying the at least one camera with an input voltage, in particular an input voltage from 4 V to 17 V, to the at least one camera;

on the outside of the camera housing of the first of the at least one camera having the central unit:

a shared connector is present for a line for the data communication between at least one of the two front plate connectors and the central unit of the first of the at least one camera, as well as the current and voltage supply of the central unit of the first of the at least one camera;

the line running from the two front plate connectors to the shared connector of the first camera of the at least one camera has a first side and a second side, wherein:

the line on the first side has a plug which is compatible with the shared connector, or a socket which is compatible with the shared connector, the line branches between the first side and the second side in a y-like manner into a first connecting line and a second connecting line on the second side in such a way that the first connecting line provides the power supply and the voltage supply to the central unit, and is connectable to a first front plate connector of the front plate connectors, and the second connecting line provides the data communication between a second front plate connector of the two front plate connectors and the central unit, and is connectable to the second front plate connector.

Here, the term "captive portal" is to be understood to mean that the same IP address is returned for each DNS query by the client. Thus, it is not possible to specify an incorrect URL, and the desired address is always reached, i.e., the camera system in this case.

The front plate connectors could be electrical connectors or one or multiple openings. In the case of one or multiple openings, the connector elements present at the end of the first and second connecting lines of the second side of the line are held in the opening or the openings and thus act as front plate connectors.

In at least one embodiment, the second side of the line also provides a third connecting line, wherein it is furthermore preferred that the third connecting line establishes contact with a determinable or predeterminable potential, and particularly preferably to a ground potential.

In at least one embodiment, the first connecting line on the second side of the line has a USB plug or a USB socket.

In at least one embodiment, the second connecting line on the second side of the line has an RJ45 plug or an RJ45 socket.

In addition, in at least one embodiment the camera housing of the first at least one camera has at least one additional shared connector which makes it possible to connect at least one additional camera in an additional camera housing to the first at least one camera, and to establish the data communication and the current supply and the voltage supply for the at least one additional camera via the at least one additional shared connector.

In at least one embodiment, the first at least one camera is connectable to additional cameras in a series connection via the at least one additional shared connector.

Likewise, in at least one embodiment the first at least one camera is connectable to additional cameras via the at least one additional shared connector, wherein the additional cameras are connectable to the first at least one camera in a parallel arrangement.

In at least one embodiment, the shared connector is designed to be gas-tight or certified according to IP67, DIN 40050 Part 5.92.

In at least one embodiment, the current supply and the voltage supply between the first at least one camera and the additional cameras are carried out at a voltage of approximately 4 VDC, preferably 4 VDC.

Likewise, in at least one embodiment the data communication and the current supply and the voltage supply between the cameras are carried out for each additional camera via an RJ45 patch cable having four wire pairs.

Furthermore, in at least one embodiment, from the supply voltage in the at least one camera, 3.3 VDC is formed for the supply of the optical sensor and the serializer, and 1.8 VDC is formed for the supply of PWM-dimmable LED lighting.

In at least one embodiment, in the case of at least one additional camera, a 4 VDC output voltage is provided for the at least one additional camera for the data communication and the current supply and the voltage supply of the first at least one camera, via the at least one additional shared connector.

A gas-insulated switchgear system according to at least one embodiment of the present invention including a camera system according to at least one embodiment of the present invention is made up of, in addition to the components known from gas-insulated switchgear systems, at least a front plate of the gas-insulated switchgear system having two front plate connectors, a central unit, at least one camera in a camera housing or in a respective camera housing, wherein the central unit is connectable to a first camera of the at least one camera for data communication, the central unit has a DHCP server and a captive portal, in particular a captive portal redirect, the camera housing or the respective camera housing of the at least one camera is conductive, and the conductive camera housing or the conductive camera housings enhance the electromagnetic compatibility and are conductively connectable to one component of the gas-insulated switchgear system, the camera housing or the camera housings are strengthened by means of natural rubber seals or carbon-free rubber seals for use in SO2 and/or salt spray environments, the central unit is accommodated in the camera housing of the first at least one camera, the central unit has a power supply for supplying current and voltage to the at least one camera and wherein the power supply is suitable for supplying the at least one camera with an input voltage, in particular an input voltage from 4 V to 17 V, to the at least one camera;

on the outside of the camera housing of the first of the at least one camera having the central unit:

a shared connector is present for a line for the data communication between at least one of the two front plate connectors and the central unit of the first of the at least one camera, as well as the current and voltage supply of the central unit of the first of the at least one camera;

the line running from the two front plate connectors to the shared connector of the first camera of the at least one camera has a first side and a second side, wherein:
the line on the first side has a plug which is compatible with the shared connector, or a socket which is compatible with the shared connector, the line branches between the first side and the second side in a y-like manner into a first connecting line and a second connecting line on the second side in such a way that the first connecting line provides the current supply and the voltage supply to the central unit, and is connectable to a first front plate connector of the front plate connectors, and the second connecting line provides the data communication between a second front plate connector of the two front plate connectors and the central unit, and is connectable to the second front plate connector.

Such a gas-insulated switchgear system including a camera system according to at least one embodiment of the present invention may in particular be combined with one of the previously preferred camera systems.

Particularly in at least one embodiment, in particular a gas-insulated provided switchgear system including a camera system is provided, wherein the first connecting line on the second side of the line has a USB plug or a USB socket, and wherein the second connecting line on the second side of the line has an RJ45 plug or an RJ45 socket.

FIG. 1 shows the basic structure of a camera system according to the present invention with a front of the system 10 having two connectors respectively on the inner side and the outer side of the front of the system. For the data communication as well as the current and voltage supply of the central unit in the housing of the first of the at least one camera 60, the line 20 has a first side 30 of the line 20, and a first connecting line 50 and a second connecting line 40 on the second side of the line 20.

The first connecting line 50 of the second side and the second connecting line 40 of the second side of the line 20 are connectable to the two connectors of the front of the system 10. The line 20 has a y-like branch 155, so that the first connecting line 50 and the second connecting line 40 of the second side merge into a connecting line 30 of the first side of the line 10. The first side 30 of the line 20 is connectable to the shared connector 100 of the first of the at least one camera.

The first of the at least one camera 60 is oriented toward an object 90 to be observed, for example, a switch, in particular a circuit breaker, a load switch, or an isolating switch.

Via an additional shared connector 110, a first additional camera 70 having an additional shared connector 110' may be connected to the additional shared connector 110 of the first camera, and may thus be integrated into the camera system. The first additional camera 70 is then oriented toward a second object 91 to be observed, for example, an additional one switch, in particular a circuit breaker, a load switch, or an isolating switch. This may, for example, also be a switch of an additional phase.

Via an additional shared connector 110", a second additional camera 80 having an additional shared connector 110' may be connected to the additional shared connector 110" of the first additional camera, and may thus be integrated into the camera system. The second additional camera 80 is then oriented toward a third object 92 to be observed, for example, an additional one switch, in particular a circuit breaker, a load switch, or an isolating switch. This may, for example, also be a switch of an additional phase. Additional cameras not shown here may be integrated into the camera system in a similar manner; the system is thus not limited to three cameras.

Figure 2:
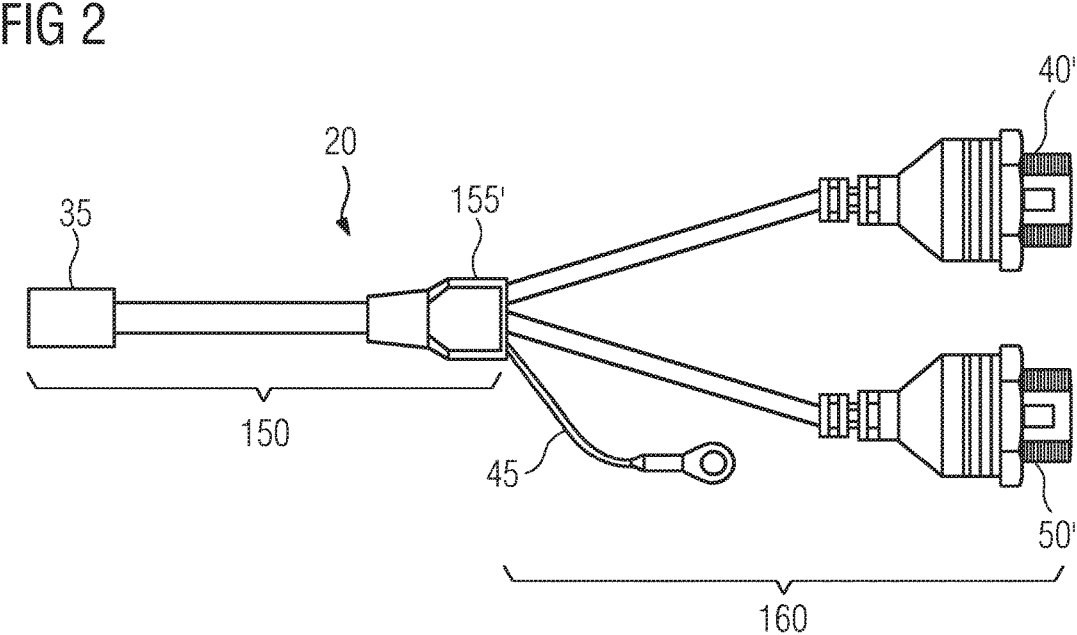
FIG. 2: line for both the data communication and the current and voltage supply of the central unit of the first of the at least one camera.

FIG. 2 shows a line 20 for the data communication as well as the current and voltage supply of the central unit of the first of the at least one camera. The line 20 has a shared connector on the outer end of the first side 150 of the line 20. At the point 155', the line 20 branches between the first side 150 and the second side 160 into three connecting lines on the second side. The three connecting lines on the second side 160 of the line 20 include a ground line 45, a second connecting line 40' of the second side, here having an RJ45 socket depicted as a connecting element, and a first connecting line 50' of the second side, here having a USB socket as a connecting element.

In one advantageous embodiment, the connecting elements of the first connecting line 50' and the second connecting line 40' of the second side on the front of the system 10 could be attached to the front of the system 10 of FIG. 1 in such a way that the connecting elements of the second side 160 of the line 20 already form the connecting elements of the front of the system. As a result, just one opening and one holding device are needed for the front of the system, for the connecting elements of the second side 160 of the line 20, rather than two respective connectors.

Figure 3:
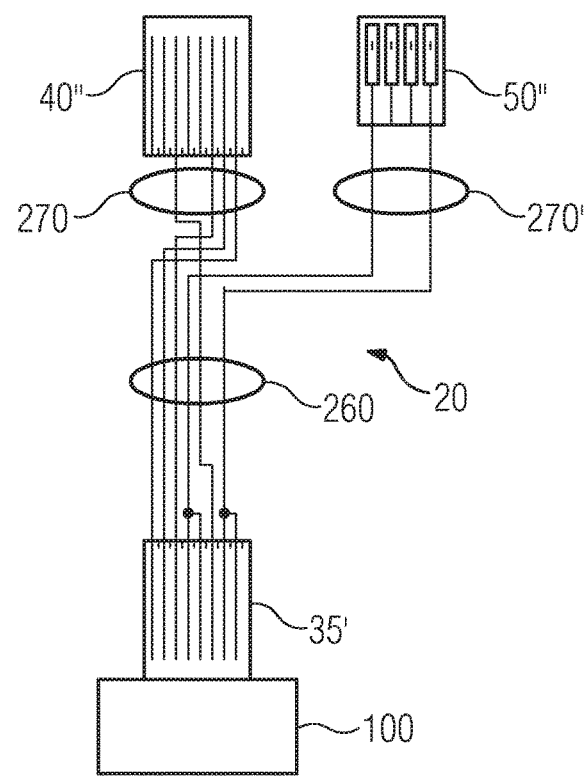
FIG. 3: schematic structure of a line for both the data communication and the current and voltage supply of the central unit of the first of the at least one camera.

FIG. 3 shows the schematic structure of a line 20 for the data communication as well as the current and voltage supply of the central unit of the first of the at least one camera. The first connecting line 50" of the second side of the line 20 and the second connecting line of the second side 40" of the line 20 are accommodated on the front of the system 10. The first connecting line 50" is routed in a cable sheath 270', and the second connecting line 40" is routed in a cable sheath 270. The first side of the line 20 is routed in a cable sheath 260. The first side has a shared connector 100 which is connectable to the first at least one camera 200.

Figure 4:
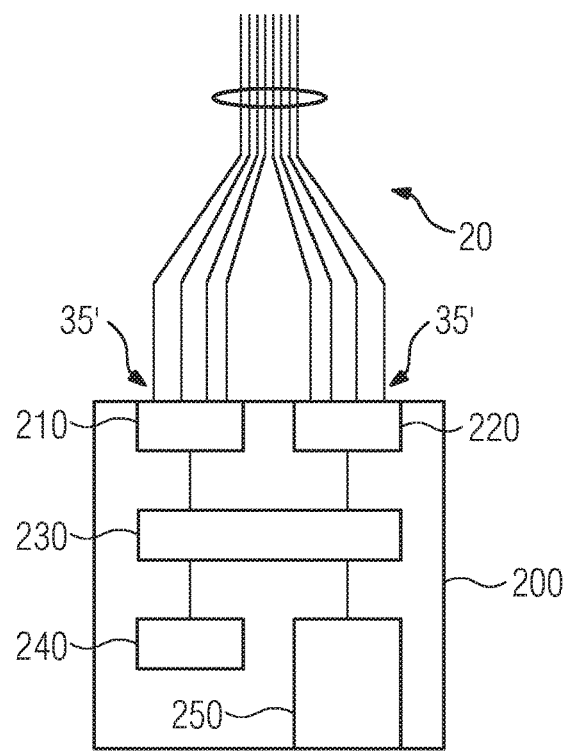
FIG. 4: schematic structure of the interface of the shared connector to the central unit.

FIG. 4 shows the schematic structure of the interface of the first side of the line 20, via the shared connector 35 of the line 20 and the shared connector 100 of the first at least one camera 200, to the first at least one camera 200, wherein the first at least one camera includes at least:
   a central unit 230,
   a power supply 220 for supplying current and voltage,
   a data communication unit 210,
   a server function including a DHCP server, web server, and captive portal redirect 240, and
   a camera 250, with optional lighting.

As depicted in FIG. 4, the line 20 may be shielded and/or provided with a ground line, wherein the two may also be designed to be combined into one.

LIST OF REFERENCE NUMBERS

10 Front of the system having two connectors respectively on the inner side and the outer side of the front of the system, or two openings for accommodating connecting elements
20 Line for the data communication as well as the current and voltage supply of the central unit of the first of the at least one camera
30 First connecting line of the first side, or first side the line 20
35 Shared connector of the first side of the line 20
35' Shared connector of the first side of the line 20
40 Second connecting line of the second side
40' Second connecting line of the second side
40" Second connecting line of the second side
45 Third connecting line of the second side
50 First connecting line of the second side
50' First connecting line of the second side
50" First connecting line of the second side
60 First of the at least one camera
70 First additional camera
80 Second additional camera
90 First object to be observed, for example, switch
91 Second object to be observed, for example, switch
92 Third object to be observed, for example, switch
100 Shared connector
100' Shared connector
110 Additional shared connector
110' Additional shared connector
110" Additional shared connector
150 First side of the line
155 Y-like branch into two connecting lines
155' Y-like branch into two or three connecting lines
160 Second side of the line
200 First at least one camera
210 Data communication unit
220 Power supply
230 Central unit
240 Web server of the central unit
250 Camera and lighting

The invention claimed is:

1. A camera system for gas-insulated switchgear systems including a front plate of the gas-insulated switchgear system including two front plate connectors, a central unit, the camera system comprising:
   at least one camera including a first camera; and
   at least one camera housing, including at least one camera housing of the first camera, the at least one camera being housed in at least one camera housing, the at least one camera housing being conductive, being configured to enhance electromagnetic compatibility, and being conductively connectable to one component of the gas-insulated switchgear system, the at least one camera housing being strengthened via natural rubber seals or carbon-free rubber seals for use in at least one of SO2 and salt spray environments,
   wherein the central unit is connectable to the first camera for data communication and including a Dynamic Host Configuration Protocol (DHCP) server and a captive portal,
   wherein at least one camera housing of the central unit is accommodated in the at least one camera housing of the first camera,
   wherein the central unit includes a power supply to supply current and voltage to the at least one camera, and wherein the power supply is suitable to supply the at least one camera with an input voltage to the at least one camera,
   a shared connector, on an outer side of the camera housing of the first camera including the central unit, for a line for data communication between at least one of the two front plate connectors and the central unit of the first camera, and as a current supply and a voltage supply of the central unit of the first camera, the line running from the two front plate connectors to the shared connector of the first camera including a first side and a second side, wherein:
      the line on the first side includes a plug, compatible with the shared connector, or a socket compatible with the shared connector,
      line branches between the first side and the second side in a y-like manner into a first connecting line and a second connecting line on the second side such that the first connecting line provides the current supply and the voltage supply to the central unit and is connectable to a first front plate connector of the front plate connectors, and the second connecting line provides the data communication between a second front plate connector of the two front plate connectors and the central unit and is connectable to the second front plate connector, wherein the camera housing of the first camera includes at least one additional shared connector to connect at least one additional camera in an additional camera housing to the first camera, and to establish the data communication and the current supply and the voltage supply for the at least one additional camera via the at least one additional shared connector.

2. The camera system of claim 1, wherein the first connecting line on the second side of the line has a USB plug or a USB socket.

3. The camera system of claim 2, wherein the second connecting line on the second side of the line has an RJ45 plug or an RJ45 socket.

4. The camera system of claim 1, wherein the second connecting line on the second side of the line has an RJ45 plug or an RJ45 socket.

5. The camera system of claim 1, wherein the first camera is connectable to additional cameras in a series connection via the at least one additional shared connector.

6. The camera system of claim 5, wherein the current supply and the voltage supply between the first camera and the additional cameras are carried out at a voltage of approximately 4 VDC.

7. The camera system of claim 6, wherein the data communication and the current supply and the voltage supply between the first camera and additional cameras are carried out for each additional camera via an RJ45 patch cable having four wire pairs.

8. A gas-insulated switchgear system including the camera system of claim 6.

9. The camera system of claim 5, wherein, from the supply voltage in the at least one camera, 3.3 VDC is formed for supply of an optical sensor and a serializer, and 1.8 VDC is formed for supply of PWM-dimmable LED lighting.

10. The camera system of claim 9, wherein a 4 VDC output voltage is provided for the at least one additional camera for the data communication and the current supply and the voltage supply of the first camera, via the at least one additional shared connector.

11. A gas-insulated switchgear system including the camera system of claim 5.

12. The camera system of claim 1, wherein the first camera is connectable to additional cameras via the at least one additional shared connector, wherein the additional cameras are connectable to the first camera in a parallel arrangement.

13. The camera system of claim 1, wherein the shared connector is designed to be gas-tight or certified according to IP67, DIN 40050 Part 5.92.

14. A gas-insulated switchgear system including the camera system of claim 1.

15. The camera system of claim 1, wherein the captive portal is a captive portal redirect.

16. The camera system of claim 1, wherein the input voltage is an input voltage from 4V to 17V.

17. The camera system of claim 1, wherein at least one of the shared connector and the additional shared connector are designed to be gas-tight or certified according to IP67, DIN 40050 Part 5.92.

18. The camera system of claim 1, wherein, from the supply voltage in the at least one camera, 3.3 VDC is formed for supply of an optical sensor and a serializer, and 1.8 VDC is formed for supply of PWM-dimmable LED lighting.

19. A gas-insulated switchgear system including the camera system of claim 1.

* * * * *